(12) United States Patent
Cooper et al.

(10) Patent No.: US 6,336,812 B1
(45) Date of Patent: Jan. 8, 2002

(54) CLINICAL AND/OR SURGICAL TRAINING APPARATUS

(75) Inventors: Carolyn Margot Cooper, Bristol; Michael John McMahon, Leeds, both of (GB)

(73) Assignee: Limbs & Things Limited, Bristol (GB)

( * ) Notice: Subject to any disclaimer, the term of this patent is extended or adjusted under 35 U.S.C. 154(b) by 0 days.

(21) Appl. No.: 09/466,615

(22) Filed: Dec. 17, 1999

Related U.S. Application Data

(63) Continuation of application No. PCT/GB98/01792, filed on Jun. 19, 1998.

(30) Foreign Application Priority Data

Jun. 19, 1997 (GB) .............................................. 9712987

(51) Int. Cl.⁷ .............................................. G09B 23/28
(52) U.S. Cl. ...................................... 434/267; 434/262
(58) Field of Search ................................ 434/262, 267, 434/268, 269, 272

(56) References Cited

U.S. PATENT DOCUMENTS

| | | | | |
|---|---|---|---|---|
| 3,688,008 A | * | 8/1972 | Krieger, Sr. ................. | 434/268 |
| 5,055,051 A | * | 10/1991 | Duncan ........................ | 434/262 |
| 5,112,228 A | * | 5/1992 | Zouras ........................ | 434/272 |
| 5,403,191 A | | 4/1995 | Tuason ........................ | 434/262 |
| 5,620,326 A | | 4/1997 | Younker ....................... | 434/268 |
| 5,775,916 A | * | 7/1998 | Cooper et al. ................ | 434/434 |
| 5,908,302 A | * | 6/1999 | Goldfarb ..................... | 434/262 |
| 5,951,301 A | * | 9/1999 | Younker ....................... | 434/272 |
| 6,062,866 A | * | 5/2000 | Prom .......................... | 434/262 |

FOREIGN PATENT DOCUMENTS

| | | |
|---|---|---|
| FR | 2 622 721 | 5/1989 |
| HU | 173 374 | 4/1979 |
| HU | 203 420 | 12/1988 |
| WO | WO 94/25948 | 10/1994 |
| WO | WO 96/30885 | 3/1996 |

OTHER PUBLICATIONS

Search Report from Hungarian Patent Office dated Sep. 28, 2000.

* cited by examiner

*Primary Examiner*—Sam Rimell
(74) *Attorney, Agent, or Firm*—Marshall, Gerstein, & Borun

(57) ABSTRACT

The training apparatus comprises a housing providing a simulation of at least part of a body and a plurality of simulations of internal body structures for reception in the housing, these simulations being a set of simulations of a particular part of the anatomy and being of increasing anatomical complexity and/or presenting increasing clinical or surgical difficulty.

13 Claims, 5 Drawing Sheets

CLINICAL AND/OR SURGICAL TRAINING APPARATUS

RELATED APPLICATION

This patent is a continuation of co-pending international application PCT/GB98/01792, filed Jun. 19, 1998 which claims the priority of Great Britain Patent Application Serial No. 9712987.8, filed Jun. 19, 1997, the text of which is hereby incorporated herein by reference in its entirety.

BACKGROUND OF THE INVENTION

The present invention relates to clinical and/or surgical training apparatus. Apparatus of this type is illustrated in Cooper et al., U.S. Pat. No. 5,775,916.

BRIEF DESCRIPTION OF THE INVENTION

According to the present invention, there is provided clinical and/or surgical training apparatus comprising:

a plurality of simulations of body structures, the simulations being a set of simulations of a particular part of the anatomy and being of increasing anatomical complexity and/or presenting increasing clinical or surgical difficulty; and means for receiving at least one of the simulations so that a surgical and/or a clinical technique may be practiced.

The receiving means may comprise a housing, for example one which provides a simulation of at least party of a body.

The simulations may be simulations of internal body structures.

The simulations may include different simulations of the gall bladder, such as with different thicknesses of gall bladder wall.

At least one of the simulations may include a simulation of a foreign body. For example, different simulations may incorporate different sizes of foreign body.

Different simulations may incorporate different degrees of toughness and respectability of fibers.

The simulations could be mounted on adjustable supports.

The present invention also comprises a clinical and/or training method using apparatus according to the invention.

The present invention also comprises a clinical and/or training method using apparatus according to the invention.

BRIEF DESCRIPTION OF THE FIGURES

The present invention will now be described, by way of example, with reference to the accompanying drawings, in which.

DESCRIPTION OF THE PREFERRED EMBODIMENTS

One embodiment of the present invention comprises a housing in the form of a closed container which, in size and shape, resembles a structure such as a human abdominal cavity in which can be placed simulations made using one or more of latex rubber, foam latex rubber, condensation room temperature vulcanized (RTV) silicone, addition cured silicone, elastomeric polyurethane and hydrocolloids, which simulate structures important to a surgeon to carry out an operation—laparoscopic cholecystectomy for example. The container is provided with a pump which simulates "blood" flow through "arteries" if appropriate.

A plurality of further simulations each comprises a similar structure to the first, but in each of which the multitude of vessels is replaced by a sac resembling the gall bladder, cystic duct and common bile duct. This is filled with a yellow fluid or non-fluid gel and sealed. A simulated vessel representing the cystic artery and hepatic artery, similarly filled with a red fluid or non-fluid gel and sealed, also lies between the skin/connective tissue and a base sheet.

Further gall bladders are used which present commonly and uncommonly found abnormalities such as fat, adherent bile duct, mesenteric extension, irregular juxtaposition of vessels and ducts, thick gall bladder wall, etc.

A sequence of such simulations will now be described by way of example.

Figure 1:
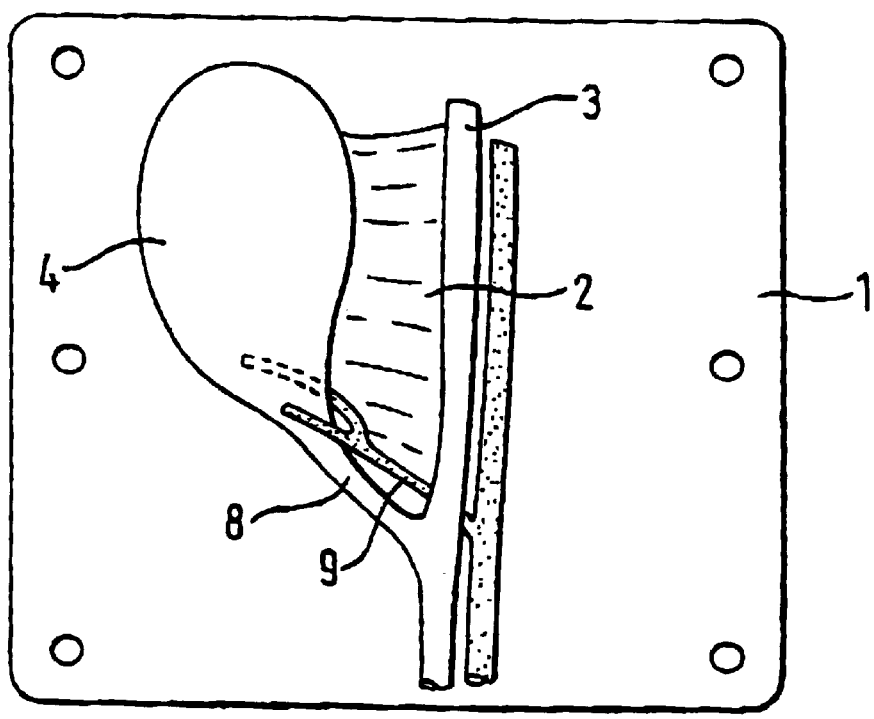
FIGS. 1–6 show a sequence of simulations of a particular part of the anatomy.

In FIG. 1, reference numeral 1 designates a base sheet, reference numeral 2 designates a simulation of the mesentery (and seen in cross-section), reference numeral 3 designates a simulation of the hepatic duct (which with the cystic duct makes up the bile duct), reference numeral 4 designates a simulation of the gall bladder, reference numeral 8 designates a simulation of the cystic artery and reference numeral 9 designates a simulation of the cystic artery and the hepatic artery.

Figure 2:
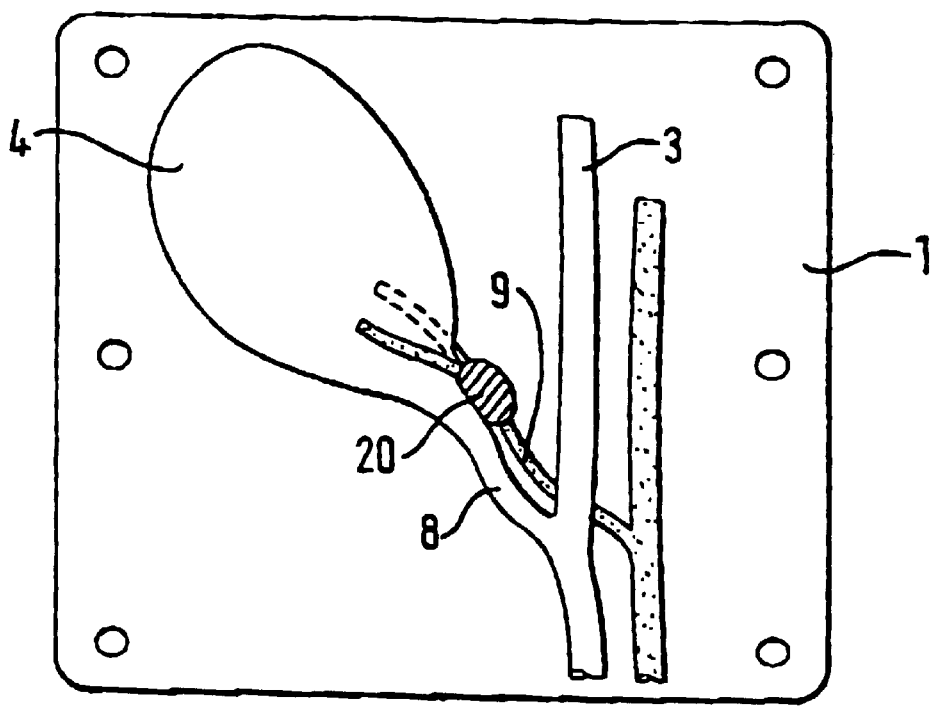

In FIG. 2, reference numeral 20 designates a simulation of a node.

Figure 3:
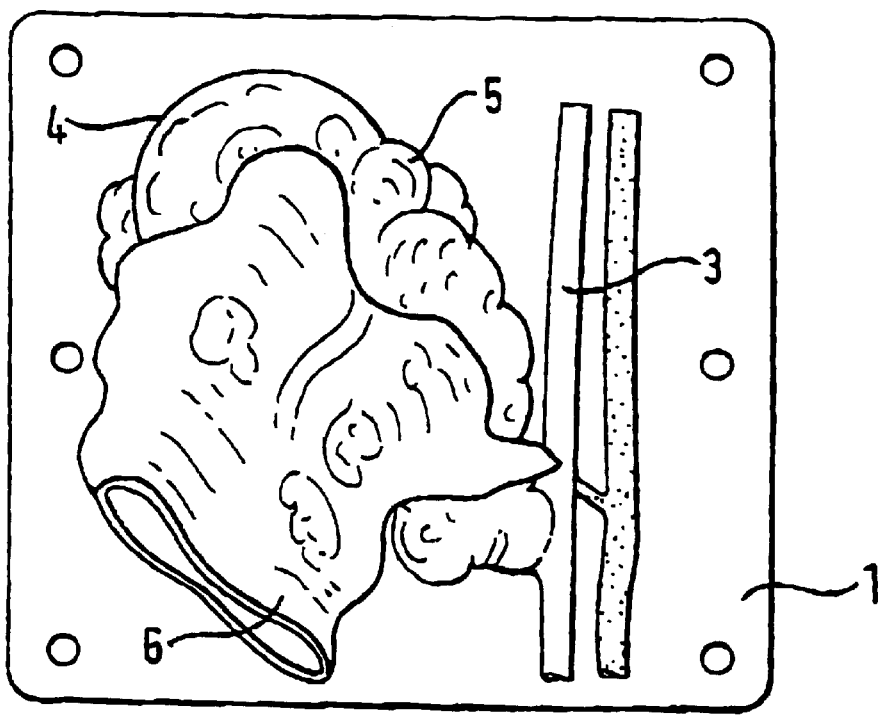

In FIG. 3, reference numeral 5 designates a simulation of fat and reference numeral 6 designates a simulation of the bowel adherent to the gall bladder and obliterating a view of it.

Figure 4:
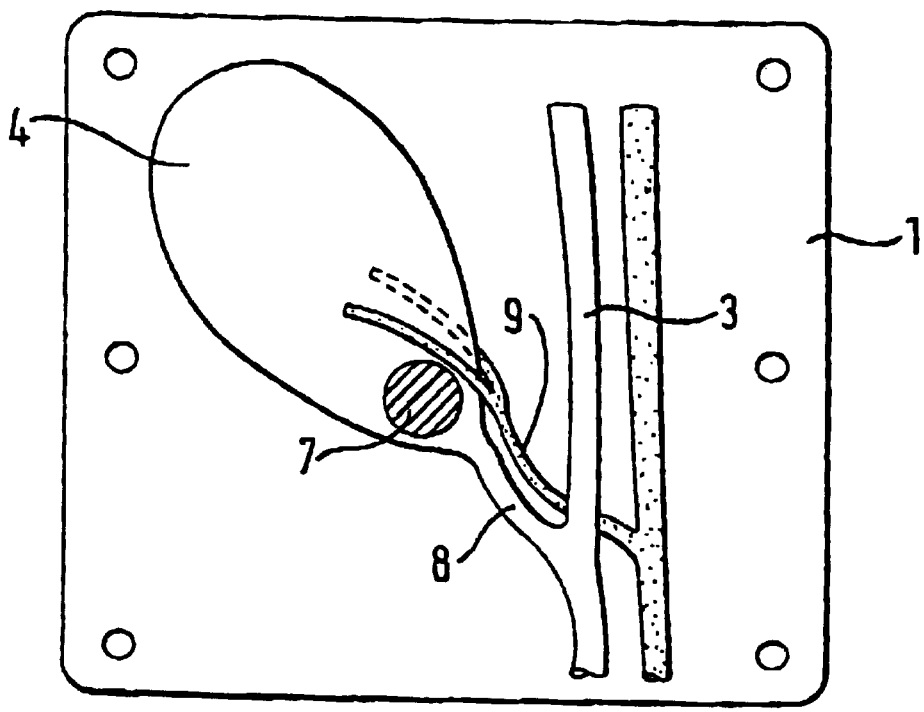

In FIG. 4, reference numeral 7 designates a simulation of a 1 cm gall stone settled adjacent the simulation of the cystic duct 8.

Figure 5:
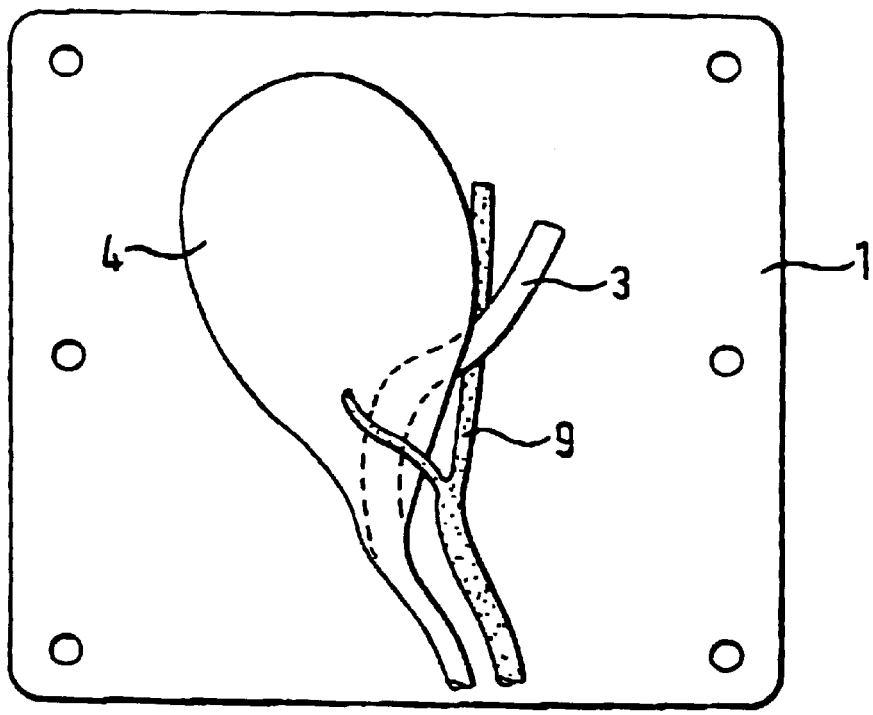

In FIG. 5, the hepatic duct 3 is shown passing behind the gall bladder 4 and crossing artery 9, the cystic duct being obscured from view.

Figure 6:
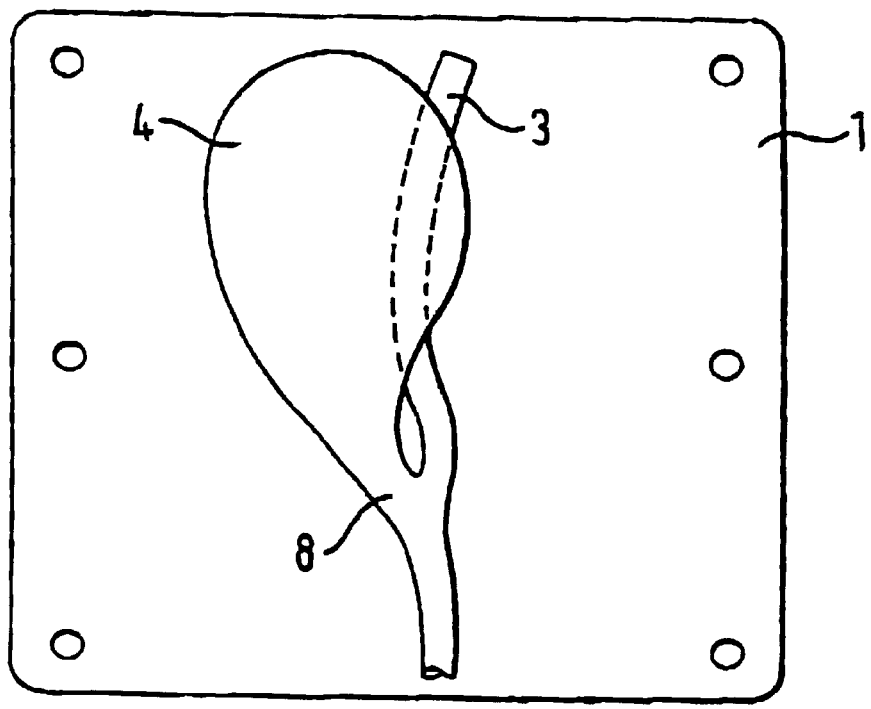

In FIG. 6, there is a very short cystic duct 8 and the hepatic duct 3 runs behind and close to the gall bladder 4.

Figure 7:
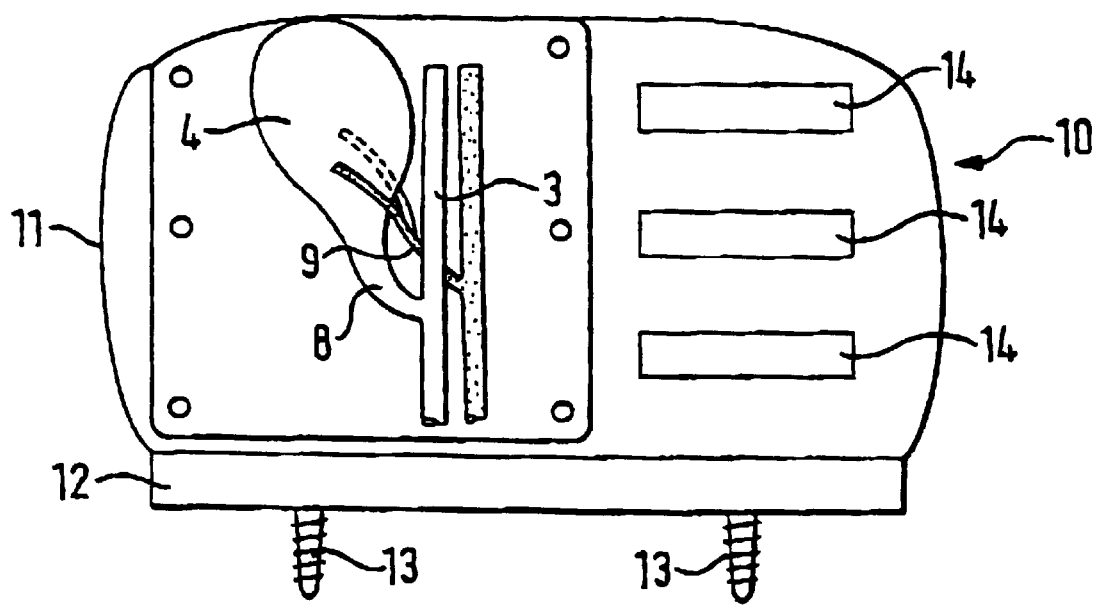
FIG. 7 shows such a simulation mounted on a jig.

FIG. 7 shows a jig 10 supporting such a simulation as described above. The jig 10 comprises a flexible frame 11 on a base 12 having screws 13 whereby the jig can be attached in a housing representing a simulation of at lest part of a body. Reference numerals 14 designate attachments for a simulation of an abnormal liver lobe—in the form, for example, of one part each of a "touch and close fastener" such as a "Velcro" fastener, the other part being attached to the liver lobe.

Figure 8:
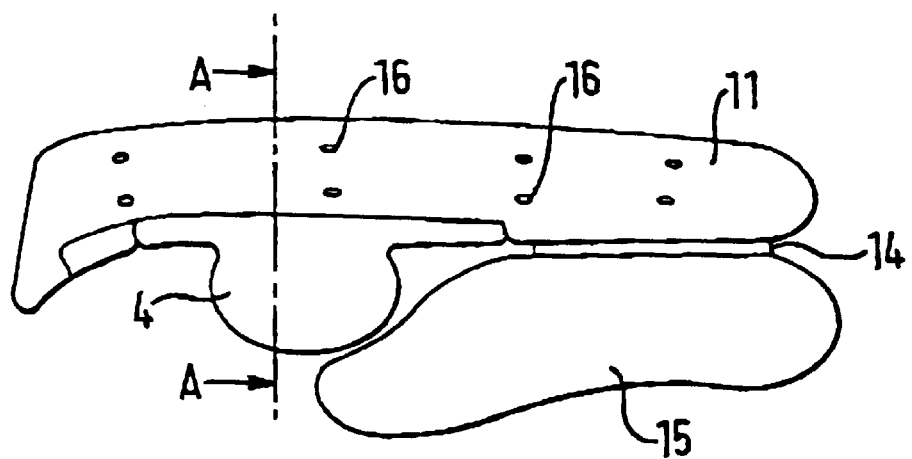
FIG. 8 is a view from above of what is shown in FIG. 5.
Figure 9:
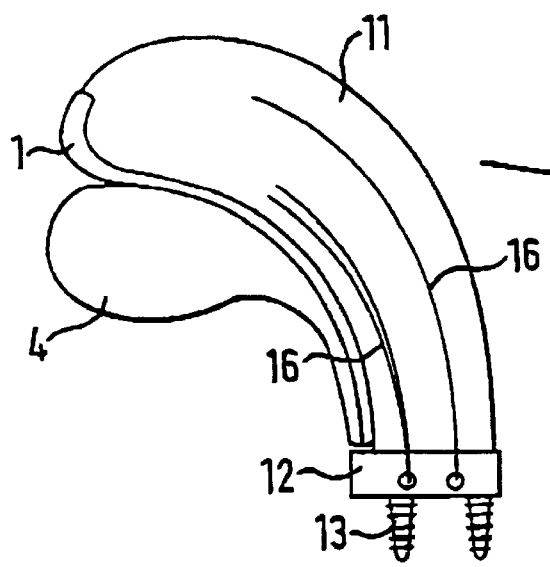
FIGS. 9 and 10 are sections through what is shown in FIG. 7, in two conditions, being sections through A—A in FIG. 8.
Figure 10:
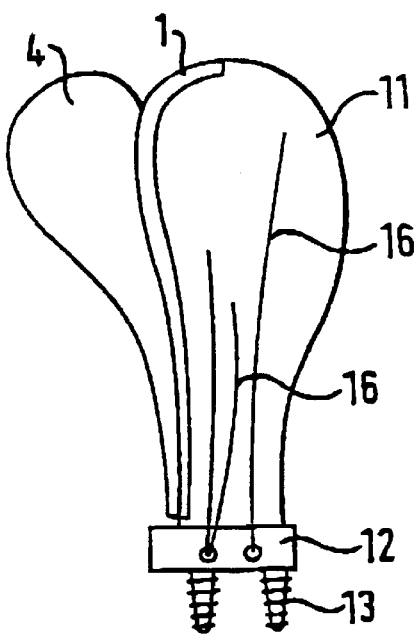
Figure 11:
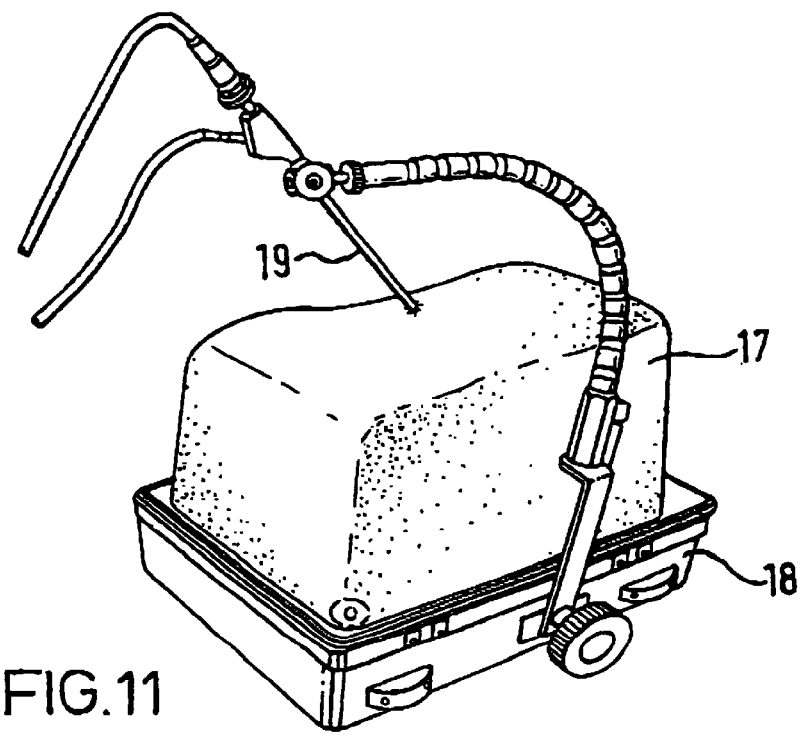
FIG. 11 shows a housing for receiving such simulations.

FIG. 8 is a view from above of what is shown in FIG. 7, reference numeral 15 designating a simulation of the front lobe of the liver, partially overlying the gall bladder 4. The frame 11 is flexibly adjustable and through it run support wires 16. The frame 11 is flexibly adjustable so that, in one condition, the arrangement is as shown in FIG. 9 (to stimulate the condition as in life and presented to a surgeon) and in another condition it is as shown in FIG. 10, to which it has been moved by a surgeon practicing an operation as in life. FIG. 9 is a section through A—A in FIG. 8. FIG. 11 shows an example of the housing, designated 17, on a base 18 and with an endoscope 19 inserted in it.

The apparatus incorporates models in the form of simulations of increasing difficulty and/or complexity to enable a trainee surgeon to encounter many commonly met difficulties and problems associated with laparoscopic or other procedures in the environment of a skill training laboratory or center. The apparatus presents, in stages, difficulties and complications as found in life.

A first simulation comprises a composite pad with a multitude of fluid filled or non-fluid gel filled vessels set in connective tissue and covered with skin. This simulation is made from rubber or polymer filled tubes, acrylic webbing steeped in a mixture of condensation RTV silicone, addition cured silicone and silicone oil in a ratio of 1:05 to 1:5 or a hydrocolloid and fine reinforced foam latex sheet or hydrocolloid reinforced, 0.01–1.00 mm thick. (See GB-A-2 227 826).

All of this is mounted on to a foam latex or synthetic sheet to form a pad.

The training apparatus may also include a detailed teaching program and instructions for setting up and running a program in a surgical and/or clinical environment, the method by which training can take place on simulated material for medical training for undergraduate and post-graduate levels being based on CD ROM and models, video tapes, Virtual Reality to complement the use of the simulations and the performance of techniques on the simulations. The instruction material may carry animation of the simulations for demonstrating procedures.

Assessment packages may accompany the complete kit to enable achievement to be measured.

The housing comprises a base, four walls and a roof. The base is solid and contains a facility to enable various types of simulations to be mounted within it. Also attached to the base is a pump, if appropriate, a reservoir to enable colored fluid to be circulated through the simulations to simulate blood flowing through arteries and veins. The walls and roof of the container are designed in size, shape and other characteristics such as fat, connective tissue, muscle, peritoneum and vessels in normal positions or abnormal positions, to simulate the abdominal wall or other structure of a patient.

For surgical procedures, the walls are so constructed that they can be punctured by conventional laparoscopic trocars in an unrestricted way, as well as conventional laparatomy incisions and abdominal incisions such as the Hasson technique, in the case of abdominal surgery. The container is capable of being expanded or inflated with carbon dioxide (or air) in the case of a simulated abdominal wall to simulate insufflation of the abdomen. Different thicknesses of the "abdominal wall" (the roof and sides of the container) may be available to simulate thin and obese patients.

In clinical situations, the structure of the container may take more of an anatomical form and feel similar to a patient. Replaceable structures which are designed to indicate presence within the container by tactile feel are held in place by pegs. If the significant features of a container are on the surface, visual appearance is therefore important as well as a tactile feel.

The anatomical simulations are prepared using materials as set out above, in such a way that they resemble structures of a human body with respect to appearance, feel and internal properties. They can be dissected by a surgeon in the same way that organs and vessels of a patient can be dissected. They may contain tubes made using materials as set out above and engineered tooling or molds, made in the pattern of vessels of the body or otherwise to simulate blood vessels which contain fluid pressurized to 80 to 150 mm Hg in a pulsatile manner, or to simply have a fluid flow from a container, to simulate blood flowing through the blood vessels. Other body fluids such as bile, may also be simulated by liquids of the appropriate color and consistency or viscosity. Alternatively, in situations in which is desirable that simulated body fluids should not flow, a non-fluid gel my be used.

In a clinical situation, the simulations have properties which are needed for a procedure. For example, during a catheterisation procedure, liquid must flow once a catheter passes through a sphincter, this being achieved using materials as set out above of the correct tensile strength and shore A hardness, and of a design which caters for the correct size of aperture and therefore feel.

The simulations are so designed that commonly encountered and important forms of pathology, and variations in anatomy, which a surgeon may expect to meet in the performance of an operation, cholecystectomy for example, are incorporated. In addition, other structures which may complicate an operation such as large amounts of abdominal fat, a large lobe of the liver, abnormally large organs, unusual angles and layout of anatomy, abnormal growths and adhesions between the organs. For example, gall bladder, fibroid uterus and bile loops, etc. may be incorporated in the simulations.

The simulations provide a progressive increase in difficulty and surprise for a trainee surgeon, who will operate on them in the same manner that a laparoscopic cholecystectomy for example would be carried in a patient.

The concepts of such a staged course training system are:
1. Modular with increasing difficulty.
2. Focused.

An Example of One of the Surgical Programs

The anatomical structures involved in laparoscopic cholecystectomy are: bile duct, gall bladder, liver, omentum, duodenum and adhesions.

Each of these anatomical organs can take on a different state. The combination of different states within the different organs together with other organs is not limited, therefore offering a wide variety of unusual conditions as met by a surgeon in the patient.

To expand on the different conditions of the organs:
Gall Bladder
    Filled with bile.
    Normal, thin walled, with or without stones.
    Normal, thick walled, with or without stones.
    Full of stones and thin walled, revealing perforation when removed from the liver base.
    Short cystic duct.
    Different variations in the arrangement of the blood vessels and the ducts.
    Unusually long mesenteric attachment of gall bladder to liver.
Stones
    Varying shapes and sizes from 0.5 to 10.00 mm across the widest point.
Liver
    The texture varying from normal through to hard (cirrhosis).
    Different degrees of toughness and dissectability created by the polymers, hydrocolloids, foam latex and silicone fibrous tissue and inflammation.
    An oversized quadrate lobe, thus getting in the way during the procedure.

Gall bladder deeply buried in the surface of the liver and hard to dissect away.

Bile Duct

A low junction of right and left hepatic duct with cystic duct into the right hepatic duct.

Right hepatic duct directly into the gall bladder.

Very thin bile duct.

No visibility through thick and difficult connective tissue.

No visibility of bile through the wall of the cystic duct and the right and left hepatic ducts.

Stones in the bile duct.

Special model for exploration of the bile duct.

Small Bowel

Loops to enable anastomosis of the small bowel to the gall bladder or the stomach.

Omentum

Containing large loops and fat not adherent but obstructing access to the gall bladder; thick and difficult connective tissue within the omentum.

Duodenum

Duodenum adherent to cystic duct and lower part of gall bladder.

Adhesions

Organs, omentum, etc. adherent to the gall bladder.

Ducts and liver to simulate pathological adhesions with varying degrees of fibrosis.

Abdominal Wall

Different degrees of thickness simulating a thin to an obese patient.

Vessels

No visibility of simulated blood through the vessel wall.

Blood and bile, viscosity to resemble that of human blood and human bile.

Additional Operations Relevant to the Gall Bladder

Exploration of the bile duct, gastoerenterostomy, Cholecyst-jejunostomy, choledocoduodenostomy and partial hepetectomy.

Extensions of the Training Principle to other Parts of the Body

Training which is focused on a combination of different pathological and unusual conditions in different organs which are related one to the other and using any and all steps of any inter-abdominal procedure such as:

Mobilization

Excision

Incision

Inspection

Exploration

Suture

Anastomosis

Electrosurgery

Coagulation Of Fluids

Laser

These techniques can be applied to the following organs or viscera:

Lungs

Heart

Pericardium

Diaphragm

Liver

Gall Bladder

Kidneys

Adrenal Glands

The main vascular system of arteries and veins

Oesophagus

Pancreas

Stomach

Duodenum

Jejunum

Small Intestine

Appendix

Large Intestine

Rectum

Anus

Uterus

Ovaries

The main systems of lymph nodes

The Brain

Eyes

Ears

Larynx

Pharynx

Nasal Cavity

Oral Cavity

Intervertebral Discs

Synovial Cavities of the Elbow, Knee, Ankle, Wrist.

Materials Used in the Construction of the Different Components of the Simulations Peritoneum A thin sheet of varying size made from reinforced silicone condensation RTV silicone or addition cured silicone and silicone oil in a ration of 1:05 to 1:5 reinforced with nylon, cotton, lycra or polyester fibre.

Alternative materials are: elastomeric polyurethane and hydrocolloids 0.01 to 1.00 mm thick.

Connective Tissue

Acrylic wadding steeped in a mixture of condensation RTV silicone and silicone oil, in ration of 1:05 to 1:5 or a hydrocolloid.

Fluid Filled Vessels

From water-based air dried liquid latex or polyurethane.

Organs (For Example Bile, Stomach, Pancreas/Filled Or Unfilled)

Hollow shape of the organ is taken from a two or more part mold using silicone and oil in a ratio of 1:05 to 1:5, elastomeric polyurethane, addition cured silicone, a hydrocolloid and foam latex. All forms are reinforced with nylon, cotton, lycra or polyester fibre. (See GB-A 2 227 826),or its eqivivalent, namely U.S. Pat. No. 5,725,916.

The filling of these organs is any one of the above in varying formulation.

Stones

Chystical "R" plaster which has been pounded and the pieces sieved to be supplied in varying sizes.

Bile and Blood

Water with water-based color and varying degrees of aqueous acrylic thickener or polyethylene glycol.

Gel

A cross-linked hydrocolloid.

Examples of clinical situations.

In clinical situations, the models provide for more difficult diagnoses and procedures.

Different pathologies can be present which can be identified by palpation.

In the case of a diagnostic clinical prostate model for example, superficial presentation of the housing is important. It presents the configuration of the male groin in standing position. The container also provides for the storage of the testicular modules which present different conditions.

These models are put in place one after the other, the external appearance where possible remains the same and the trainee has to identify the condition through palpation and/or ultrasound. The testicles are made according to instruction under the heading "Organs" above.

In the case of a breast model for diagnosis and procedure, diagnosis of pathologies would be made through palpation, ultrasound and X-ray.

Procedures of aspiration and biopsy would be made using the appropriate needles and, if desired, under ultrasound vision.

Such parts of the body which would be presented for diagnosis and procedure using palpation, ultrasound, X-ray, and Magnetic Resonance Imaging would be the abdominal cavity and the normal contents of organs within it, including:

Aspiration
Drainage
Injection
Palpation
Biopsy
Needle Biopsy
Percutaneous Biopsy
Curettage
Electro Cautery These techniques can be applied to the following organs or viscera:

Liver
Gall Bladder
Kidneys
Adrenal Glands
The main vascular system of arteries and veins
Oesophagus
Pancreas
Stomach
Duodenum
Jejunum
Small Intestine
Appendix
Large Intestine
Rectum
Anus
Uterus
Ovaries
The main systems of lymph nodes
The Brain
Eyes
Ears
Larynx
Pharynx
Nasal Cavity
Oral Cavity
Intervertebral Discs
Synovial Cavities of the Elbow, Knee, Ankle, Wrist Conditions on the skin can appear on any part of the simulated body parts.

Overall Design of the Training Program

The program provides skills training in all chosen aspects of surgical and clinical procedure. A surgeon or clinician who completes the skills training will be competent to carry out the operation or procedure in a patient if he or she has had no prior experience of surgery or significant exposure to the clinical environment. This is achieved by:

Incorporation in the training of all steps involved in the procedure.

Progressive increase in the difficulties encountered.

Awareness of the common and important hazards of the operation such as dangerous variations in anatomical features in the models.

Structured CD ROM and models, video assisted training guides and/or Virtual Reality programs which incorporate the use of models.

Structured assessment of the progress of the trainee.

The following features (individually or in any combination) also comprise aspects of the present inventions:

The incorporation of pulsatile fluid flow.

The availability of different thicknesses and complexity of structure including relevant layers which are found in life, and are needed to perform current and future procedures, for example, opening the abdomen, excision of pathologies superficially from the skin, removal of lymph nodes endoscopically, draining of fluid from the sinuses of the brain, supporting medical devices which enable both open and endoscope surgery to be performed simultaneously.

The support system for the simulations within the apparatus in the form of specially designed jigs which support the soft tissue assemblies, the required angle and in the required position.

Simulation of pathological changes in the simulated organs.

The incorporation of anatomical variations such as abnormal length of ducts and vessels, retroverted uterus.

The provision of difficulties such as simulated fat and adherent bile loops.

Structured progressive and comprehensive nature of the skills trainers—all aspects of the operation are trained and it is thus analogous to a flight simulator for a pilot.

The CD ROM and models and/or video assisted instructional program and/or the Virtual Reality program.

The assessment process.

What is claimed is:

1. Clinical and/or surgical training apparatus comprising:
a plurality of simulations of body structures, the simulations being separate first and second simulations of the same organ and being different anatomically; and
means for receiving at least one of the simulations so that each simulation can be presented in turn for a surgical and/or clinical technique to be practiced on the simulation.

2. Apparatus according to claim 1, wherein the receiving means comprises a housing.

3. Apparatus according to claim 2, wherein the housing provides a simulation of at least part of a body.

4. Apparatus according to claim 1, wherein the first and second simulations are simulations of an internal body structure.

5. Apparatus according to claim 1, wherein the first simulation includes arrangements of blood vessels and ducts that are different from said second simulation.

6. Apparatus according to claim 1, wherein the first and second simulations are different simulations of a gall bladder.

7. Apparatus according to claim 6, wherein the first and second simulations have different thicknesses of a gall bladder wall.

8. Apparatus according to claim 1, wherein at least one of the first and second simulations includes a simulation of a foreign body.

9. Apparatus according to claim 8, wherein different first and second simulations incorporate different sizes of a foreign body.

10. Apparatus according to claim 1, wherein the first simulation incorporates a different degree of toughness and resectability of fibers from said second simulation.

11. Apparatus according to claim 1, wherein the first and second simulations are interchangeably mounted on an adjustable support means for adjustability supporting a simulation, carried by said housing.

12. Clinical and/or surgical training apparatus comprising:
- a plurality of simulations of body structures, the simulations being separate first and second simulations of the same organ, said first and second simulations differing in anatomical structure; and
- a housing for receiving at least one of the simulations so that each simulation can be presented in turn for a surgical and/or clinical technique to be practiced on the simulation.

13. Apparatus according to claim 12, wherein the anatomical difference between said first and second simulations is selected from the group consisting of abdominal fat; lobe size; unusual anatomical angle and layout; abnormal growth; adhesions between organs; peritoneum wall thickness; connective tissue; fluid filled vessels; organ shape; organ size; presence of stones; varying shape or size of stones; amount of bile; organ perforation; short cystic duct; arrangement of blood vessels; length of mesenteric attachment of gall bladder to liver; organ texture: ease of dissectability of organ; oversize quadrate lobe; organ buried in a surface of another organ; fibrosis; adhesions; organ adherent to thin bile duct; connective tissue lowering visibility; no visibility of bile duct; right hepatic duct directly into gall bladder; and low junction of right and left hepatic duct with cystic duct into the right hepatic duct.

* * * * *